United States Patent [19]

Schultz

[11] Patent Number: 5,050,129
[45] Date of Patent: Sep. 17, 1991

[54] MARINE SEISMIC DATA CONDITIONING

[75] Inventor: Philip S. Schultz, Clamart, France

[73] Assignee: GECO A/S, Sandvika, France

[21] Appl. No.: 649,178

[22] Filed: Feb. 4, 1991

Related U.S. Application Data

[63] Continuation of Ser. No. 454,319, Dec. 26, 1989, abandoned.

[30] Foreign Application Priority Data

Jan. 3, 1989 [GB] United Kingdom ............... 8900037

[51] Int. Cl.$^5$ ............................................. G01V 1/38
[52] U.S. Cl. .......................................... 367/21; 367/63
[58] Field of Search ..................... 367/15, 20, 21, 51, 367/63, 74

[56] References Cited

U.S. PATENT DOCUMENTS

4,809,235 2/1985 Dragoset, Jr. .................. 367/21
4,870,624 9/1989 Marschall ..................... 367/15

Primary Examiner—Ian J. Lobo
Attorney, Agent, or Firm—Fleit, Jacobson, Cohn, Price, Holman & Stern

[57] ABSTRACT

An encoded seismic source, such as a marine vibrator, and a receiver, such as a seismic streamer, are pulled through water at constant velocity and depth. The source is periodically actuated and the reflected acoustic signals are converted by the receiver into seismic data. The seismic data are transformed to a fixed reference frame relative to earth before being processed.

5 Claims, 6 Drawing Sheets

MARINE SEISMIC DATA CONDITIONING

This application is a continuation of application Ser. No. 07/454,319, filed Dec. 26, 1989 now abandoned.

BACKGROUND OF THE INVENTION

The present invention relates to a method of conditioning marine seismic data obtained by a moving marine seismic receiver co-operating with a moving marine seismic source. Such a method is particularly effective with an "encoded" source, such as a marine vibrator, and at least one hydrophone, for instance a plurality of hydrophones or groups of hydrophones in a streamer, as the receiver, all of which are towed behind a vessel. An "encoded" source is a source which produces seismic energy over a prolonged period, for instance several seconds or tens of seconds, for each "shot" as opposed to an impulsive source, such as an array of air guns, which produces a burst of seismic energy over a short period, for instance several milliseconds or tens of milliseconds.

Marine seismic data acquisition has been performed using a marine vibrator source of the type comprising a hemispherical casing closed by a circular membrane which is caused to vibrate so as to act as a source of acoustic signals. The vibrator is deployed from flotation members which are towed behind a vessel, and is caused to vibrate by internal drive means controlled from the vessel so as to emit acoustic energy which travels through the water as propagating wave fronts. Suitable pressure transducers such as hydrophones, for instance in the form of a streamer, are likewise deployed from flotation members and towed behind the vessel so as to pick up acoustic signals reflected from the seabed and substrata.

The vibrator is energised or controlled by a signal whose frequency varies with time, for instance in accordance with a sweep function which causes the frequency to sweep from a low frequency to a high frequency for each "shot" recording. During data acquisition, the vessel moves at a constant relatively slow speed, generally of a few knots, so that the vibrator and the hydrophones are not stationary with respect to the earth, or reflecting body, but are continuously moving. The sweep function and the speed of movement relative to the earth are generally such that the vibrator and the hydrophones have moved a significant distance between the start and end of the sweep function.

U.S. Pat. No. 4,780,856 discloses a method of this type and suggests a suitable sweep function.

Data acquired by this type of method were previously processed using the same techniques as have been used for land-based vibrator seismic exploration, in which the source and the receivers are fixed. This resulted in a phase distortion of the wavelet in the final imaged section, the severity of which distortion depends on the angle of inclination or "dip" of the reflecting layer. In particular, if the reflecting layer has zero dip, there is no phase distortion whereas the distortion increases with the angle of dip.

These problems were recognized in a paper entitled "Marine Vibrators and the Doppler Effect" by W. H. Dragoset presented at the 50th Annual Meeting of the European Association of Exploration Geophysicists in 1988, and a possible solution to this problem was proposed and is disclosed in U.S. Pat. No. 4,809,235. The problem was analyzed in terms of the Doppler effect and it was proposed that a correction filter be applied during processing of the data. During such processing, the transmitted and received signals are correlated, and it was proposed that the filter should be applied after this correlation. This provides only an approximate solution to the problem and requires processing of the acquired data, which processing is dependent on the sweep function used to sweep the output frequency of the vibrator.

BRIEF SUMMARY OF THE INVENTION

According to a first aspect of the invention, there is provided a method of conditioning marine seismic data obtained by at least one moving marine seismic receiver co-operating with at least one moving marine seismic source, comprising transforming the seismic data to a stationary reference frame.

Such a method does not form part of the processing of the data, but provides conditioning of the data before processing. Seismic data are normally stored during seismic data acquisition and are subsequently processed, for instance at a land-based data processing center, so that the conditioning method may be applied while gathering the data and prior to storage or when the stored data are read out, for instance for processing. The conditioned data are free from any phase dispersion effects due to moving sources and receivers, which effects are intrinsic to the unconditioned data, so that no phase dispersion is present during any data processing stage. Also, the conditioning is independent of the swept function in the case of a seismic source whose frequency is swept during each shot, such as a marine vibrator. Further, the method is theoretically exact in that no approximations have to be made.

In marine seismic data acquisition, the source and receiver are generally supported in the water such that they remain at substantially constant depth and move in the same direction. In such situations, it is sufficient to perform the transformation in a single co-ordinate or direction, which reduces the conditioning which is necessary to transform to a stationary reference frame. Preferably, by using midpoint-offset co-ordinates it is sufficient to perform a transformation step in only the midpoint co-ordinates, again reducing the conditioning requirements.

According to a second aspect of the invention, there is provided a method of acquiring and conditioning marine seismic data comprising deploying at least one moving marine seismic receivers, repeatedly actuating the source, recording for each source actuation traces of acoustic signals received by the receivers, and transforming the traces to a stationary reference frame.

According to a third aspect of the invention, there is provided and apparatus for conditioning marine seismic data obtained by at least one moving marine seismic receiver co-operating with at least one moving marine seismic source, comprising means for transforming the seismic data to a stationary reference frame.

According to a fourth aspect of the invention, there is provided a system for acquiring and conditioning marine seismic data, comprising at least one marine seismic receiver, at least one marine seismic source, and means for transforming the seismic data to a stationary reference frame.

BRIEF DESCRIPTION OF THE DRAWINGS

The invention will be further described, by way of example, with reference to the accompanying drawings, wherein.

DETAILED DESCRIPTION

Figure 1:
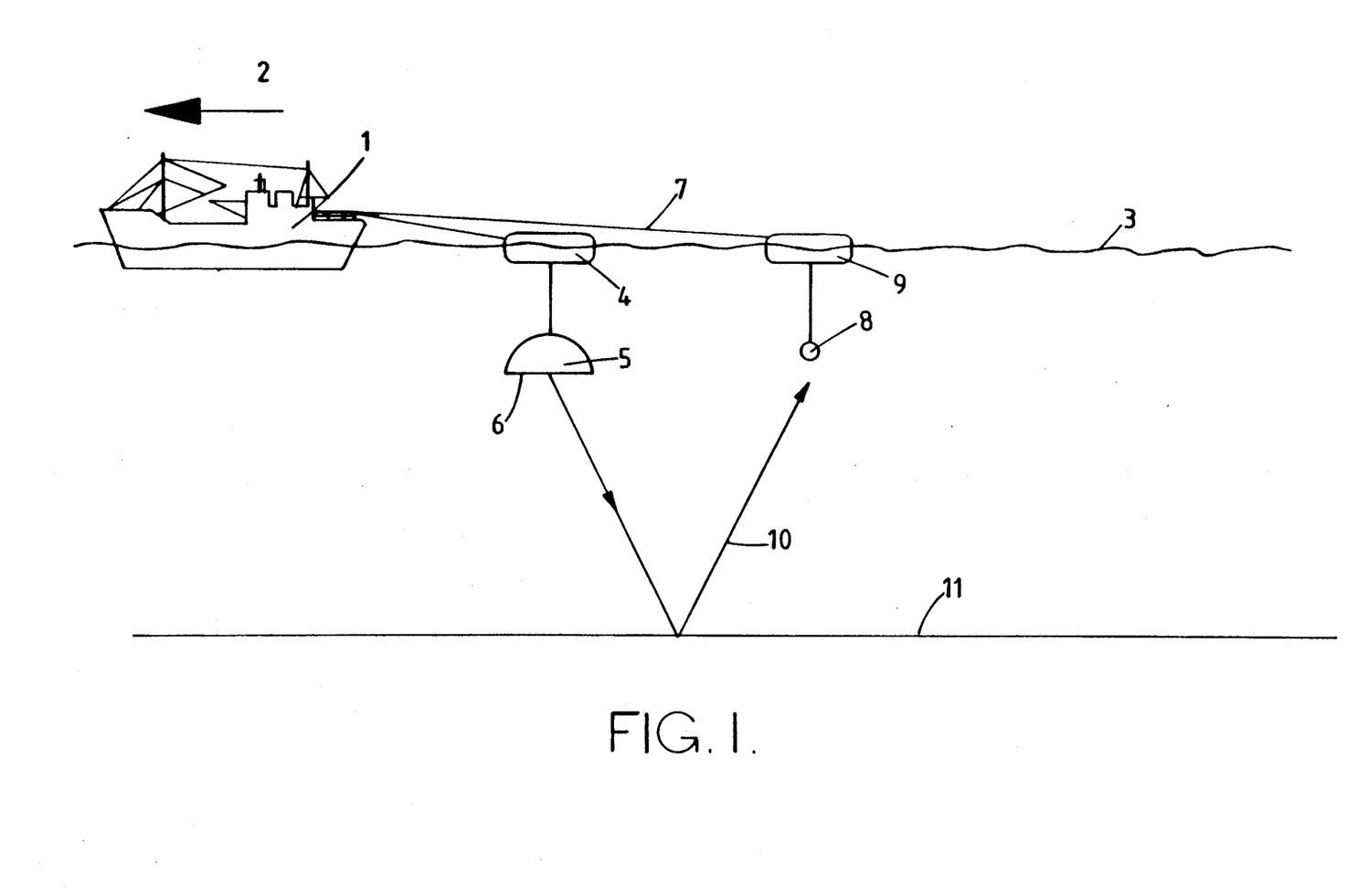
FIG. 1 is a diagram illustrating marine data acquisition using a marine vibrator as a source.

FIG. 1 shows a marine seismic exploration vessel 1 moving in the direction indicated by arrow 2 through the sea whose surface is shown at 3. The rear deck of the vessel 1 is connected by a towing line to a float 4, which may be any suitable flotation apparatus such as a Norwegian buoy or a paravane. A marine vibrator 5 is suspended from the float 4 so as to be at substantially constant depth in the water. The vibrator 5 is generally hemispherical and has a membrane 6 which is caused to vibrate so as to emit an acoustic signal.

The rear deck of the vessel 1 is also connected by a towing line 7 to a receiver arrangement which, for the sake of simplicity, is illustrated as a hydrophone 8 suspended from a float 9. The float 9 may take any suitable form and may support more than one hydrophone 8. Alternatively, a streamer may be deployed from the rear deck of the vessel 1. Such a streamer can typically be up to 5 kilometers in length with hydrophones or groups of hydrophones spaced regularly along the length at intervals of 25, 12.5 or 6.25 meters.

FIG. 1 illustrates a ray path 10 representing a signal emitted by the vibrator 5, reflected from the reflecting body, or seabed or substrata 11, and received by the hydrophone 8.

The membrane 6 of the vibrator 5 is excited by an encoded signal, for instance of the form:

$$\text{Sin}(at^2)$$

Where a is a constant and t represents time. This function is such that the vibrator emits a signal whose frequency starts from an initial low value and is swept up to a final high value for each shot provided by the vibrator or vice versa.

Figure 2:
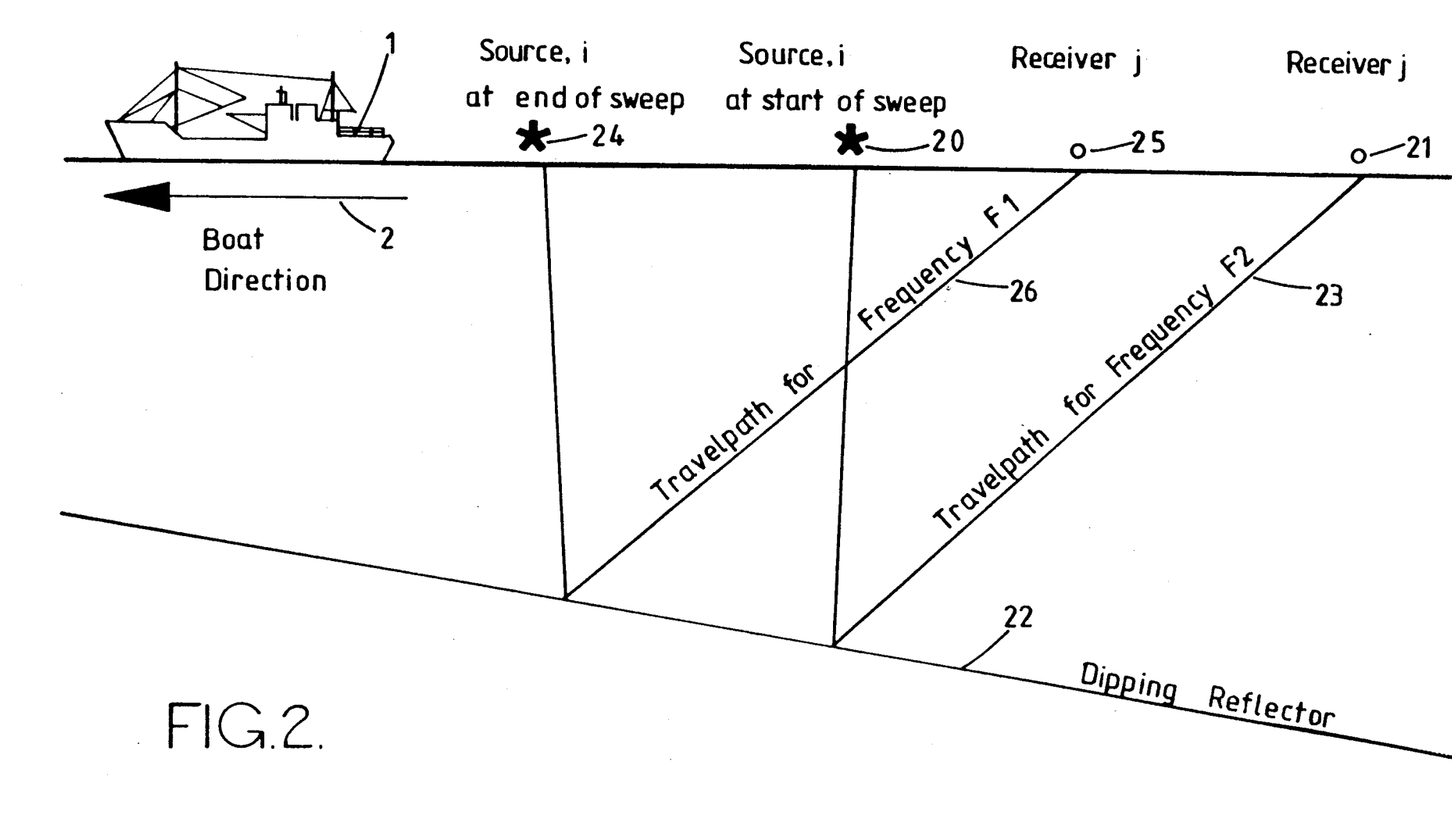
FIG. 2 illustrates the effect of source and receiver movement for a dipping reflector.

FIG. 2 shows a general case where there are a plurality of sources and a plurality of receivers, and illustrates how phase dispersion occurs with reflections from a dipping reflector. During the time required for each complete frequency sweep, both the sources and the receivers move a significant distance $\Delta s$ with respect to the earth. At the start of a sweep at time T1, the ith source is at the position shown by 20 in FIG. 2 and is emitting acoustic radiation of frequency F2, and the jth receiver is at the position shown at 21. The dipping reflector is shown at 22 and the ray path from the ith source at 20 to the jth receiver at 21 is shown at 23. The complete two-way travel time of the wavefront from the source to the receiver via the reflection at the dipping reflector 22 is t1. At the end of the sweep at time T2, the ith source is at 24 and is emitting acoustic radiation of frequency F1 (different from F2), the jth receiver is at 25, and the corresponding ray path is shown at 26, representing a two-way travel time of t2. Depending on the inclination of the dipping reflector 22, there will be a significant difference between the travel times t1 and t2, which gives rise to phase dispersion.

In order to remove phase dispersion from the processing of the acquired data, the following method is employed for each shot. For the sake of simplicity, a single source and a single receiver have been assumed. However, the preconditioning technique may be applied to systems employing any desired numbers of sources and receivers.

Figure 3:
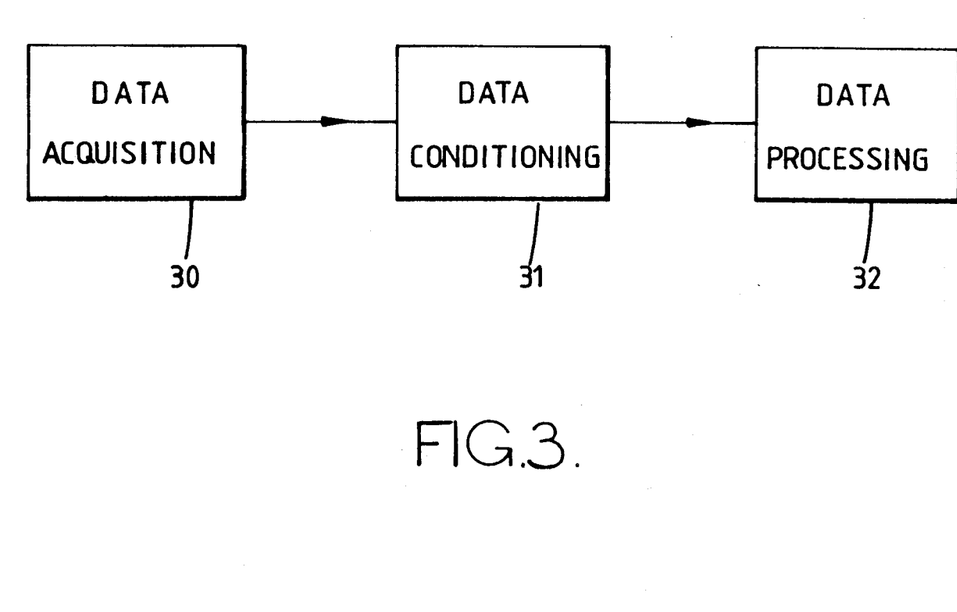
FIG. 3 is a schematic block diagram illustrating the use of a method constituting a preferred embodiment of the invention.

FIG. 3 illustrates schematically the steps in performing marine seismic exploration using a preferred method. The exploration begins with a data acquisition step 30, for instance using an arrangement of the type illustrated in FIGS. 1 and 2. The vibrator 5 and the hydrophone 8 are towed behind the vessel 1 at a speed through the water of a few knots and the vibrator 5 is actuated periodically, for instance at every 25 meters travelled by the arrangement. The resulting pressure signal received by the hydrophone 8 is supplied to the vessel where it is recorded.

Data recorded in the acquisition step 30 are subjected to a conditioning step 31 which transforms the data to a stationary reference frame. An analysis and description of the transformation will be given hereinafter. The conditioned data are then supplied to a data processing step 32 where the conditioned data are subjected to processing by any suitable technique, for instance involving correlation with the sweep function controlling the vibrator. The data processing step 32 is normally performed at a different time and location from the acquistion step 30. For instance, the stored data from the vessel are sent to a land-based processing center.

Although the conditioning step 31 is shown in FIG. 3 as taking place after the raw data have been stored in the acquisition step 30, it is also possible for the conditioning step 31 to be performed at the same time as acquisition so that conditioned data are stored ready for subsequent data processing.

The following analysis and description refer to a common shot record and a common receiver record.

Marine data (whether encoded or impulsive) are collected with a system of continuously moving sources and receivers. For encoded sources of long time duration such as vibrators, it is necessary to find a data transformation which can simulate recording in a stationary reference frame with respect to the solid earth (i.e. the subsurface reflecting layers).

Consider a single common source recording (i.e. a "shot record"). Even though the source function is encoded and the source itself is moving, once a packet of energy begins propagating, it is independent of the movement of its source and becomes dependent only on its propagating medium, which is effectively stationary. The waves propagating in a stationary medium comprise the interrogating mechanism inherent in the seismic technique.

The waves propagating in a stationary medium are recorded by a moving receiver. A simple data transformation is derived to simulate the recording as if the receiver were stationary. Let S and R be the moving (i.e. time-dependent) shot and receiver co-ordinates during a single shot record, let t be the time co-ordinate for each shot record such that $t=0$ at the shot initialization, let the stationary (i.e. earth-based) shot and receiver co-ordinates during that shot (at $t=0$) be given respectively by:

$$X_S \text{ and } X_R$$

and let the boat velocity (relative to the earth) be given by:

$$V_B$$

The sign convention for the boat velocity is that it is positive in the direction of increasing spatial co-ordinate:

$$X_R \text{ or } X_S$$

The relationship for the receiver co-ordinates then becomes:

$$X_R = R + V_B t$$

The recording of the wavefield "P" is made in coordinates S, R and t. That is, data set P (S, R, t) is recorded, where S takes a single value for a common shot record, and where the receiver channel is in the moving reference frame. The aim of this technique is to convert P (S, R, t) into a transformed dataset.

All standard processing techniques assume the data in the form P' ($X_S$, $X_R$, t) whereas in fact the data are in the unconditioned form P(S, R, t). The differences are small for impulsive sources but are larger the longer the encoded sources, i.e. increase as the time duration of the encoded source increases. It is now simply necessary to make a change of variables from R to the stationary co-ordinate for receivers, using the above equations. This transformation is a time-varying spatial regridding (resampling) of the data, involving spatial interpolation.

The data have been transformed so as to simulate that recorded with stationary receivers. The next step is to continue the transformation so as to simulate data recorded with a stationary source e.g. a vibrator which is not moving.

A common receiver gather will be considered where data from one receiver location (not channel) are collected. The receiver is stationary because the transformation in the above equation has been applied, but the or each source is still moving. The principle of "reciprocity" is involved here which is a common and well documented principle in geophysics. It states that the source and receiver can be interchanged without affecting the data recorded (except for external noise sources).

Using the principle of reciprocity, the common receiver gather can be considered to be essentially the same as a common shot gather. In this reciprocal shot gather, the reciprocal source is the stationary receiver, and the reciprocal receivers are the moving sources. In this case, it has been argued that, once an energy packet has been produced by the reciprocal source, it can be considered to be simply a wavefield propagating in a stationary medium. The reciprocal receivers can now be transformed into a stationary co-ordinate system in a parallel manner as above for the common shot gather using the equation below:

$$X_S = S + V_B t$$

In these transformations, the time co-ordinate t remains unchanged.

The transformation of the recorded data into a stationary co-ordinate frame by two separate transformations of the shot and receiver spatial co-ordinates has now been completed. The transformation was done before any correlation. The order is essential: correlation must not be done until after the co-ordinate transformation. It is convenient to perform the transformation in midpoint-offset co-ordinates rather than shot-receiver co-ordinates: The following definitions of notation are used: Y and H refer to the moving midpoint and half-offset co-ordinates, respectively, and $$X_Y \text{ and } X_H$$

refer to the stationary midpoint and half offset co-ordinates. Midpoint and half-offset are standard co-ordinates in geophysical processing theory, and definitional relationships for these variables in terms of shot and receiver co-ordinates are as follows:

$$X_Y = \frac{X_S + X_R}{2}$$

$$X_H = \frac{X_S - X_R}{2}$$

$$Y = \frac{S + R}{2}$$

$$H = \frac{S - R}{2}$$

The transformation equations will be derived for the following direct transformations, $$Y \to X_Y$$

$$H \to X_H$$

Using the previously established relations among the variables gives $$\begin{aligned} X_Y &= \frac{X_S + X_R}{2} \\ &= \frac{S + R}{2} + V_B t \\ &= Y + V_B t \end{aligned}$$

and $$\begin{aligned} X_H &= \frac{X_S - X_R}{2} \\ &= \frac{S - R}{2} \\ &= H \end{aligned}$$

Thus the transformations to a stationary co-ordinate system can be done once in the midpoint-offset co-ordinates instead of twice in the shot-receiver co-ordinates, since the half-offset co-ordinate is unchanged by the transformation. That is, the transformation can be applied to the data in one step on common offset sections.

This method of correcting for the phase dispersion of "marine vibroseis" data has several advantages, including the ability to apply the technique during acquisition as a preconditioning step. An onboard computer can keep a buffer of incoming data in a pipeline and in real time apply a time-varying spatial filter which interpolates the data with appropriate filters derived from the above equations to transform to stationary co-ordinates. This is not preprocessing, but simply a preconditioning of the data. That is, the data are still unprocessed but are properly conditioned to match assumptions inherent in the standard marine processing sequence.

This technique has the following advantages:

the correction steps are totally independent of the sweep function used;

except for numerical errors the method is exact;

the method is consistent with normal movement (NMO) and dip moveout (DMO) in prestack processing;

the method can be used during acquisition as a preconditioning of the data; and the technique preconditions the data such that no phase dispersion is present during any stage of the processing. A practical preferred embodiment of the invention will now be described. In this embodiment, a vessel 40 (FIG. 4) moves at constant velocity in the direction of arrow 41 and tows a single encoded source 42, in the form of a marine vibrator, and a streamer 43 having a plurality of equi-distantly spaced receivers 44, such as hydrophones or groups of hydrophones. The spacing between adjacent receivers is $\Delta g$ meters, for instance 25 meters.

Figure 4:
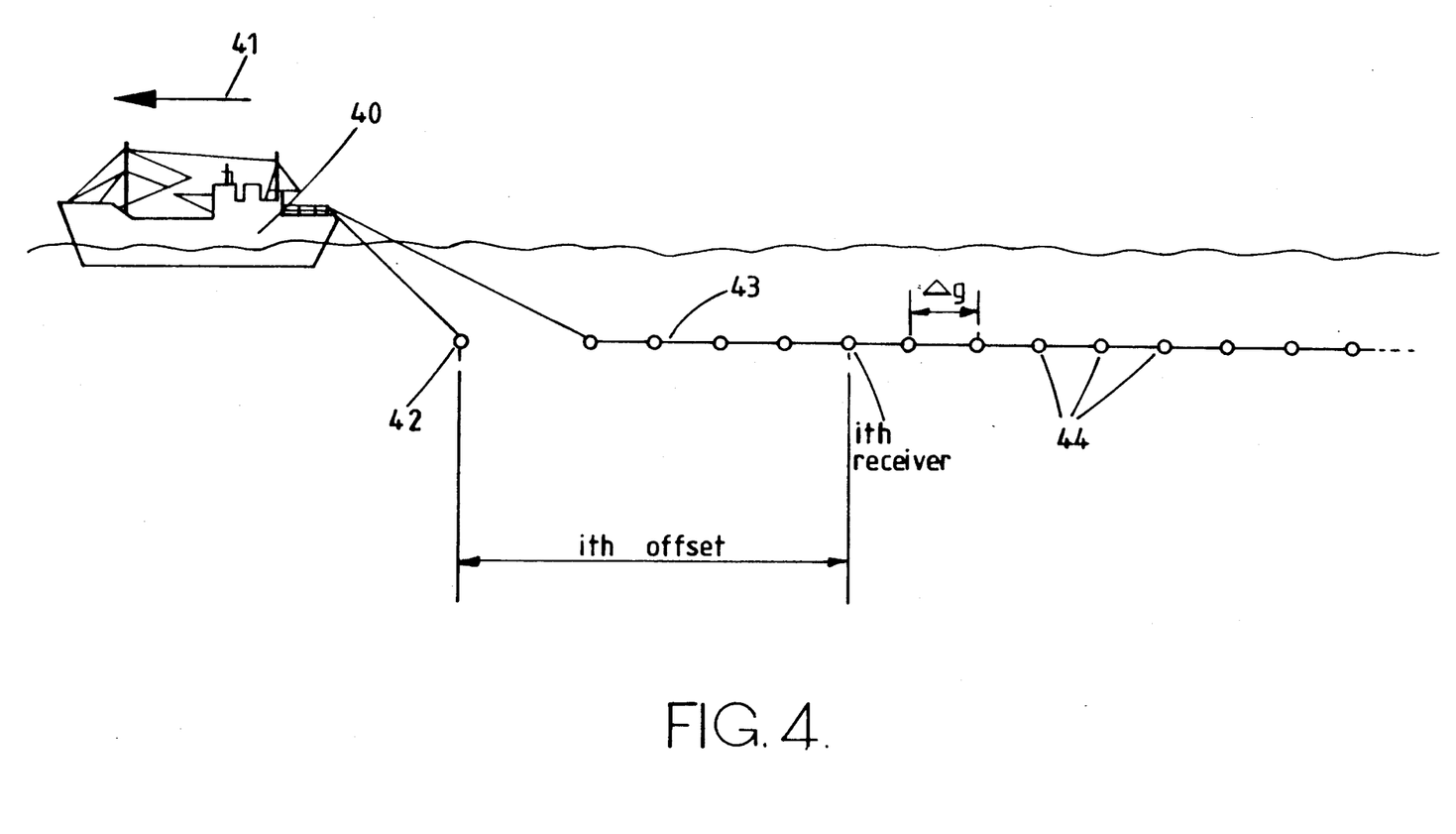
FIG. 4 is a diagram illustrating a preferred seismic surveying arrangement.

A "common offset section" is, as is well known, a set of consecutive traces received by a particular one of the receivers for consecutive shots of the source 42, the term "offset" being the distance between the source 42 and the receiver in question (the ith offset for the ith receiver being illustrated in FIG. 4).

Because of the discrete nature of the individual shots, the received data represent spacial sampling and problems can arise if the sample spacing is too coarse. In particular, spacial aliasing can result in reduced resolution of reflection boundaries in the data resulting from the seismic exploration.

Various conflicting requirements limit the minimum sampling interval which can be provided. Ideally, consecutive shots should be performed with the minimum possible spacial separation. However, with encoded sources, in order to supply sufficient energy for satisfactory signal-to-noise ratios, the source supplies energy over a substantial time period as the total energy supplied is dependent on the duration of operation of the source for each shot. A new shot cannot commence until the preceding shot has been completed. Although the velocity of the towing vessel can be reduced so as to reduce the sampling intervals, there is a practical limit to the reduction in velocity of the vessel, for instance so as to maintain substantially constant the geometry of the source and receivers.

There is therefore a practical and commercial limit to reducing the sampling intervals, and this determines the amount of spacial aliasing which will be present.

However, for any particular combination of parameters such as receiver spacing $\Delta g$ and minimum vessel velocity, the sampling intervals can be effectively reduced by an interleaving technique which will now be described.

Figure 5:
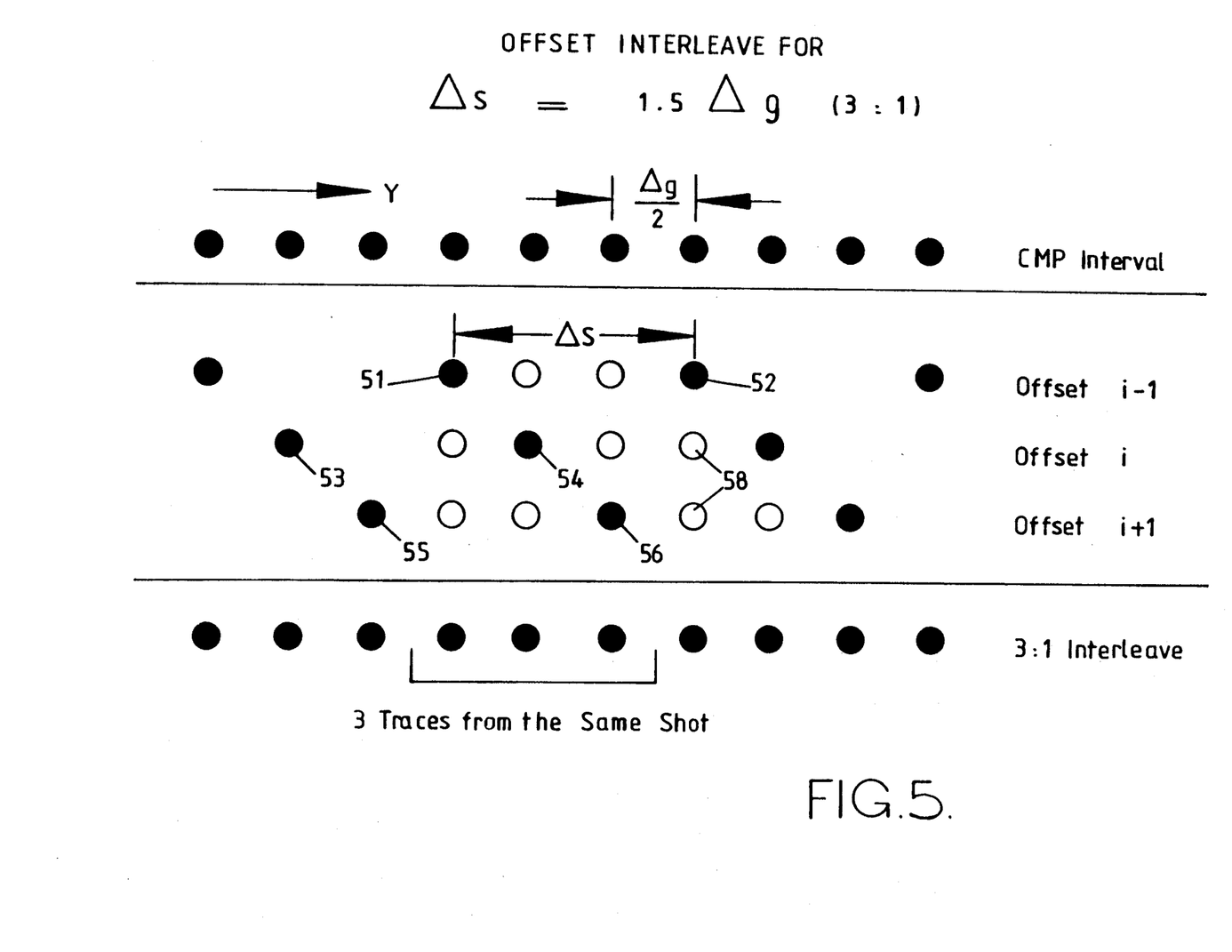
FIGS. 5 and 6 are diagrams illustrating steps in a method constituting a preferred embodiment of the invention.

The expression $\Delta s$ represents the spacing between positions of the source 42 at the start of consecutive shots. The black dots in FIG. 5 represent the positions of receivers in the direction Y of movement of the vessel 40 with respect to the earth at the start of consecutive shots. Thus, the row of dots indicated as "offset i−1" represents the positions of the (i−1)th receiver with respect to the earth at the start of consecutive shots, with the rows of dots indicated as "offset i" and "offset i+1" representing the positions for the ith and (i+1)th receivers. FIG. 5 illustrates an interleaving technique for increasing the sampling resolution threefold (an "interleave ratio" of 3:1), but any suitable interleave ratio n greater than 1 can be provided.

In order to provide an interleave ratio of n, the spacing $\Delta s$ is set equal to the product of (n/2) and the receiver spacing $\Delta g$. Thus, for an interleave ratio of 3:1 as illustrated in FIG. 5, $\Delta s$ is made equal to 1.5 x $\Delta g$.

The effect of this is illustrated by FIG. 5. Thus, between an nth shot (with the (i−1)th receiver at 51) and an (n+1)th shot (with the (i−1)th receiver at 52), the ith receiver moves from 53 to 54 and the (i+1)th receiver moves from 55 to 56. The traces from the common offset sections of the (i−1)th, ith, and (i+1)th receivers are therefore interleaved with each other and provide a spacial sampling interval of $\Delta g/2$ to give a threefold improvement of resolution with respect to the interval spacing $\Delta s$, as illustrated in the row of dots referred to as "CMP interval".

Although it is not strictly necessary to provide equally spaced interleaving, such equal spacing is convenient in that it provides a constant spacial sampling interval and gives maximum resolution for a given order of interleaving.

In practice, it is convenient to perform a marine seismic survey in the following way. As a first step, single offset sections are formed by associating consecutive traces from each receiver of a given offset. The density of traces in each single offset section is then increased (equivalent to reducing the trace spacing) to that of the common midpoint (CMP) trace spacing by inserting the appropriate number of "zero traces" i.e. blank records associated with the interleaved positions, between the original traces of the offset section. In other words, the number of traces is multiplied by the interleave ratio.

Figure 6:
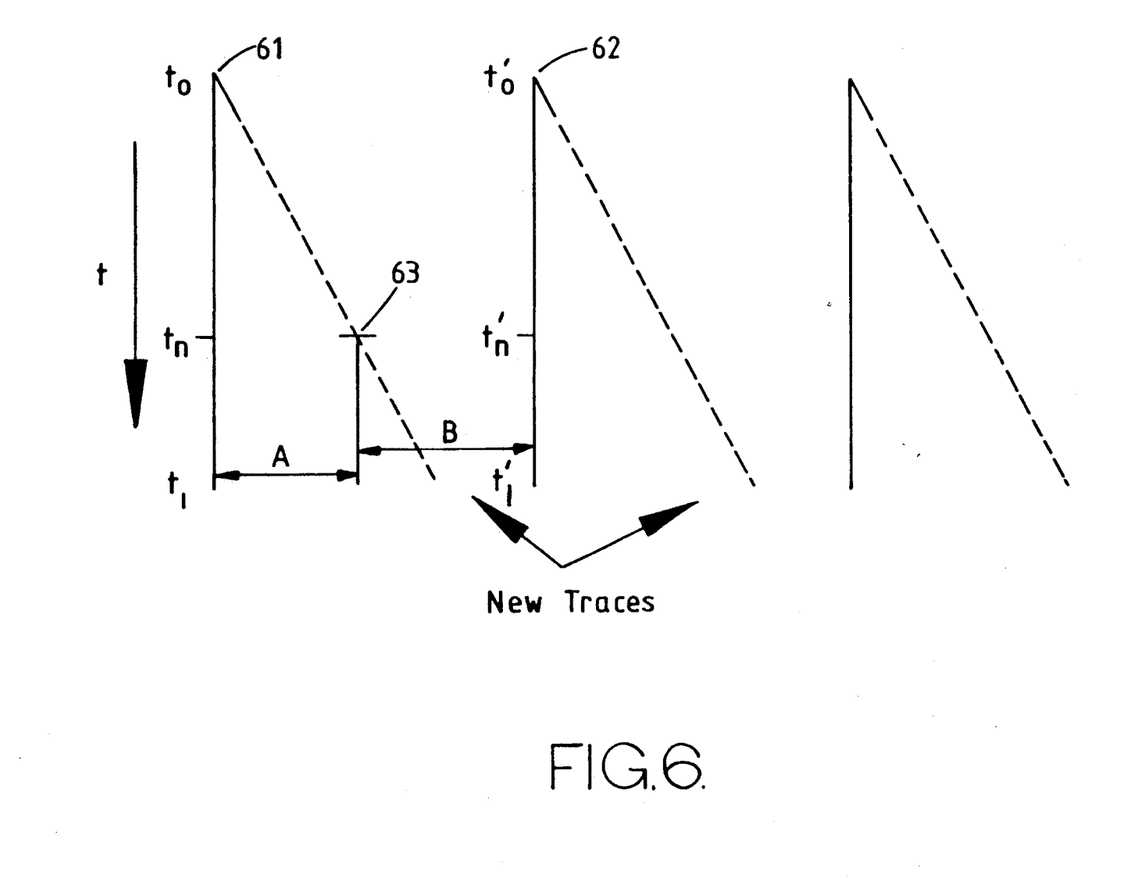

The next step comprises performing the co-ordinate transformation on each of the individual offset sections generated in the previous step, by transforming from the moving co-ordinate system of the common offset traces to the fixed co-ordinate system of the earth. This is illustrated graphically in FIG. 6 as a time-varying spacial interpolation of the individual traces. In FIG. 6, the time axis extends vertically downwardly and is repeated for each new shot with the individual graphs being spaced horizontally such that the start of each shot is represented as being at the same height on the time axis. The horizontal axis represents position with respect to the moving co-ordinate system. Thus, the first shot illustrated in FIG. 6 starts at 61 at time $t_0$ and finishes at time $t_1$. The next shot begins at 62 at time $t'_0$ and finishes at the time $t'_1$, and so on for the remaining shots shown in FIG. 6.

The data received by the ith receiver between the time $t_a$ and the time $t_1$ is transformed to the stationary co-ordinate system so that, at each time during that interval, the data are referred to the actual position of the receiver with respect to the fixed co-ordinate system i.e. earth. To achieve this, data from one or more of the surrounding traces are combined by any suitable interpolation algorithm so as to form the new transformed traces indicated in FIG. 6 by the broken lines. For example, a linear interpolation from the two surrounding traces may be used to form the new trace. Thus, in this example, at time $t_n$, the new trace at point 63 is formed by adding the value of the trace at time $t_n$ multiplied by a weighting factor $B/(A+B)$ to the value of the trace at time $t'_n$ multiplied by the weighting factor $A/(A+B)$.

As a result of the preceding described steps, the data acquired by the seismic survey have now been preconditioned so as to reduce spacial aliasing and, as described in greater detail hereinbefore, so as to transform from moving to fixed co-ordinates with respect to the earth. The preconditioned data may then by subjected to any suitable processing steps in order to reveal the desired information about the structure of the earth below the seabed, for instance in accordance with conventional techniques known as "vibroseis". However, because the "zero traces" are still present as independent traces, the data are not yet ready for imaging at this stage. For the sake of completeness, an example of suitable subsequent processing steps will be briefly described.

The preconditioned data are subjected to a correlation operation which has the effect of compressing the encoded source function. This correlation operation is well known in the art and will not be described further.

A technique known as differential normal moveout (NMO) is then applied to each offset section so as to transform it to the mean offset in each offset section group. This technique is used so as to compensate for the different path lengths, and hence different time delays, between the source and each of the receivers in the streamer for horizontal reflectors. For instance, corrections may be applied so that all of the offset sections are made to correspond to a time delay which would occur if the acoustic energy had travelled vertically downwardly from the source and had been reflected vertically upwardly to each receiver.

It should be noted that each offset section group is defined by the interleaving operation. Thus, for an interleave ratio of 2:1, the offset section groups comprise pairs of offset sections at offsets 1 and 2, 3 and 4, 5 and 6, etc. For an interleave ratio of 3:1, offset sections groups are offsets 1, 2, 3; 4, 5, 6; 7, 8, 9; etc., and so on for higher interleave ratios.

The next processing step may comprise the application of differential dip moveout (DMO) to each offset section so as to transform it to the mean offset in each offset section group, or full DMO to each offset section individually, so as to compensate for dipping reflectors. In the former case, a further DMO operation has to be added after the following step. The effect of applying DMO is to make a dipping reflector behave like a horizontal reflector as regards arrival time as a function of offset. In other words, DMO compensates for differences in arrival time of reflected signals for different positions along a streamer when reflections are taking place from a dipping or inclined reflective boundary layer.

The next step is to perform a mini-stack of all sections in each offset section group and assign the mean offset to each resultant section. After this step, the number of offset sections is reduced by the interleave ratio. In other words, various traces from different offsets which correspond to the same position relative to the fixed co-ordinate system are added together so that traces corresponding to the "zero traces" which were added in a preceding step as described above are effectively removed as independent traces. It should be noted that the transformation described above has changed the "zero traces" into traces containing "live" data. Referring to FIG. 5, a few of the added zero traces are shown by empty circles, such as at 58, and the separate existence of these traces is now removed by the mini-stack. It should be noted that no resolution is lost in this step because the preceding NMO and DMO steps have properly conditioned the data so as to maintain the temporal and spacial resolution for the mini-stack. In other words, the sections in each offset section group have been processed so as to take into account the various different times of arrival of reflected signals and correspond to the same positions with respect to the fixed co-ordinate system, so that they may simply be added together without any loss of information.

Further processing, such as stacking, may then be performed in the normal way as the data resulting from the mini-stack are now in a form to which conventional processing techniques may be applied. At this stage, the data are fully corrected and the only difference from data acquired by a conventional technique is that there are fewer offset sections as a result of the mini-stack.

I claim:

1. A method of acquiring and preconditioning marine seismic data, said method comprising the steps of:
   deploying at least one marine seismic source for movement with respect to a reflecting body;
   deploying a plurality of marine seismic receivers for movement with respect to the reflecting body;
   moving said at least one source and said receivers at the same predetermined velocity and in the same direction relative to said reflecting body;
   defining a moving reference frame having coordinates and moving relative to said reflecting body from coordinates of said at least one source and said receivers;
   producing encoded acoustic signals by said at least one source to be reflected by said reflecting body;
   receiving reflected signals from said reflecting body by said receivers to provide marine seismic data in the form of a plurality of seismic traces;
   repeatedly actuating said at least one marine seismic source to produce said acoustic signals at intervals;
   recording for each actuation of said at least one marine seismic source said seismic traces of acoustic signals received by said plurality of marine seismic receivers of said moving reference frame; and
   producing derived traces from said plurality of seismic traces by linear interpolation along a trajectory defined by said predetermined velocity organized in a common offset section.

2. A method as claimed in claim 1, wherein:
   said trace recording step comprises forming said traces as a plurality of single offset sections;
   said method further comprises interleaving said single offset sections in sets; and
   said producing derived traces is performed on said interleaved offset sections.

3. A method as claimed in claim 2, wherein said deploying step includes:
   arranging said plurality of marine seismic receivers with a predetermined constant spacing $\Delta g$ between adjacent receivers; and
   moving each of the plurality of moving marine seismic receivers by a distance $\Delta s$ relative to the reflecting body between consecutive actuations of said at least one marine seismic source, wherein $2\Delta s/\Delta g$ is substantially equal to an integer greater than one.

4. A system for conditioning marine seismic data comprising:

at least one moving marine seismic source moving relative to a reflecting body and for emitting encoded acoustic signals to be reflected by said reflecting body;

at least one moving marine seismic receiver moving relative to said reflecting body and cooperating with said at least one moving marine seismic source for obtaining marine seismic data by receiving said signals reflected by said reflecting body to provide marine seismic data in the form of a plurality of seismic traces;

means for moving said source and receiver at a predetermined velocity in the same direction to define a moving reference frame having coordinates and moving relative to said reflecting body; and means for transforming said marine seismic data to a stationary reference frame which is stationary with respect to said reflecting body by producing derived traces from said plurality of seismic traces by linear interpolation along a trajectory defined by said predetermined velocity organized in a common offset section.

5. A method of preconditioning marine seismic data obtained by at least one marine seismic receiver, which is moving with respect to a reflecting body, cooperating with at least one marine seismic source, which is moving with respect to said reflecting body, said method comprising:

moving said at least one source at a predetermined velocity relative to said reflecting body;

moving said at least one receiver at said predetermined velocity relative to said reflecting body;

producing encoded acoustic signals by said at least one source to be reflected by said reflecting body;

receiving reflected signals from said reflecting body by said at least one receiver to provide marine seismic data in the form of a plurality of seismic traces; and producing derived traces from said plurality of seismic traces by linear interpolation along a trajectory defined by said predetermined velocity organized in a common offset section.

* * * * *